United States Patent
Sugita et al.

(10) Patent No.: US 7,482,716 B2
(45) Date of Patent: Jan. 27, 2009

(54) LINEAR MOTOR WITH CLAW-POLE ARMATURE UNITS

(75) Inventors: Satoshi Sugita, Nagano (JP); Yuqi Tang, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 447 days.

(21) Appl. No.: 11/421,261

(22) Filed: May 31, 2006

(65) Prior Publication Data

US 2006/0273665 A1 Dec. 7, 2006

(30) Foreign Application Priority Data

Jun. 1, 2005 (JP) ............................. 2005-161789

(51) Int. Cl.
*H02K 41/02* (2006.01)
*H02K 41/03* (2006.01)

(52) U.S. Cl. ...................................................... 310/12

(58) Field of Classification Search .............. 310/12–15, 310/257

See application file for complete search history.

(56) References Cited

U.S. PATENT DOCUMENTS

| | | | |
|---|---|---|---|
| 6,541,880 B2 * | 4/2003 | Okada et al. ................... | 310/12 |
| 6,548,919 B2 * | 4/2003 | Maki et al. ..................... | 310/12 |
| 6,825,581 B1 | 11/2004 | Joong et al. | |
| 6,856,050 B2 * | 2/2005 | Flechon ......................... | 310/12 |
| 7,250,696 B2 * | 7/2007 | Kim et al. ...................... | 310/12 |
| 2004/0178684 A1 | 9/2004 | Joong et al. | |

FOREIGN PATENT DOCUMENTS

| | | | |
|---|---|---|---|
| JP | 01-160348 | | 6/1989 |
| JP | 05015139 A | * | 1/1993 |
| JP | 11-289742 | | 10/1999 |
| JP | 2005-057822 | | 3/2005 |

* cited by examiner

*Primary Examiner*—Tran N Nguyen
(74) *Attorney, Agent, or Firm*—Rankin, Hill & Clark LLP

(57) ABSTRACT

A linear motor capable of reducing thickness thereof in a direction orthogonal to a moving direction of a movable element therein is provided.

A first claw pole type yoke unit 11A and a second claw pole type yoke unit 11B are arranged for a pair of linear portions 9a of a coil 9, respectively. The first and second claw pole type yoke units 11A and 11B are arranged so that first pole teeth 15 of the first claw pole type yoke unit 11A face second pole teeth 17 of the second claw pole type yoke unit 11B and the second pole teeth 17 of the first claw pole type yoke unit 11A face the first pole teeth 15 of the second claw pole type yoke unit 11B. Permanent magnet rows 19A to 19C are interposed between the first claw pole type yoke unit 11A and the second claw pole type yoke unit 11B of corresponding coil units 7A to 7C, respectively, so that both sides of each of the permanent magnet rows 19A to 19C face the first and second pole teeth 15 and 17 of the first and second claw pole type yoke units 11A and 11B, respectively.

11 Claims, 7 Drawing Sheets

US 7,482,716 B2

LINEAR MOTOR WITH CLAW-POLE ARMATURE UNITS

BACKGROUND OF THE INVENTION

The present invention relates to a linear motor. More specifically, the invention relates to a linear motor that uses a claw pole type yoke unit.

Japanese Patent Application Laid-Open Publication No. 160348/1989 discloses a linear motor including a stator constituted by an armature unit and a movable element constituted by a permanent magnet row unit. The armature unit includes a coil made of annularly winding conductors and claw pole type yoke units arranged for the coil. The coil includes a pair of linear portions and a pair of coupling portions. The pair of linear portions extend linearly and face each other with a spacing therebetween. The pair of coupling portions connect the pair of linear portions. Each of the claw pole type yoke unit includes a plurality of first pole teeth, a plurality of second pole teeth, and a yoke. The first pole teeth extend in one direction and are arranged to form a row along the linear portions of the coil. The second pole teeth extend in the other direction opposite to the one direction and are arranged to form a row along the linear portions of the coil. The yoke magnetically couples the first pole teeth to the second pole teeth. Each of the claw pole type yoke units is arranged so that the first pole teeth and the second pole teeth are exposed toward an outside of the coil. The permanent magnet row unit includes a permanent magnet row formed by a row of a plurality of permanent magnets and a back yoke made of a magnetic material, for supporting the permanent magnet row in a state where this permanent magnet row is arranged in parallel. Then, the permanent magnet row unit is arranged adjacent to the coil so that magnetic pole surfaces of the permanent magnet row face the first and second pole teeth of the claw pole type yoke units.

In the linear motor of this type, it is required to reduce thickness of the linear motor in a direction orthogonal to a moving direction of the movable element. However, in the conventional linear motor, reduction of the thickness is limited. Further, in the conventional linear motor, the back yoke made of the magnetic material must be used for the permanent magnet row. Further, an allowable load of a bearing with a small thickness is small. Thus, life of the bearing is reduced due to a magnetic attraction force of the linear motor.

SUMMARY OF THE INVENTION

An object of the present invention is therefore to provide a linear motor capable of reducing thickness of the linear motor in a direction orthogonal to a moving direction of a movable element therein.

Other object of the present invention is to provide a lightweight linear motor which offers a great thrust force and which eliminates the need for using a back yoke made of a magnetic material for a permanent magnet row unit therein.

Still other object of the present invention is to provide a linear motor capable of extending life of a bearing therein.

A linear motor of the present invention includes a permanent magnet row unit and an armature unit. The permanent magnet row unit includes a plurality of permanent magnet rows each formed of a row of a plurality of permanent magnets; and a support for supporting the permanent magnet rows in a state where the permanent magnet rows are arranged in parallel. The permanent magnets constituting the permanent magnet rows are magnetized so that the magnetic pole of each of the permanent magnets appears on each side of each of the permanent magnet rows in a direction in which the permanent magnet rows are arranged, and so that different polarities of magnetic poles appear alternately on each of the permanent magnet rows in the direction in which the permanent magnet rows extend. The armature unit includes a plurality of coil units respectively provided corresponding to the permanent magnet rows, and the armature unit is set with the permanent magnet row unit.

Each of the coil units of the armature unit includes a coil made of annularly winding winding conductors; and first and second claw pole type yoke units arranged for the coil. Then, the first and second claw pole type yoke units are structured to be arranged on the coil so that the main portion of the internal space of each of the coil units is formed between the first claw pole type yoke unit and the second claw pole type yoke unit.

The coil includes a pair of linear portions extending linearly and facing each other with a spacing therebetween; and a pair of coupling portions coupling the pair of linear portions.

The first and second claw pole type yoke units are arranged relative to the coil so that the first and second claw pole type yoke units accommodate the pair of linear portions, respectively, and so that inside each of the first and second claw pole type yoke unit, a corresponding one of the pair of linear portions extends.

Each of the first and second claw pole type yoke units includes first pole teeth, second pole teeth, and a yoke magnetically coupling the first pole teeth to the second pole teeth. The first pole teeth extend in one direction proceeding from the armature unit to the permanent magnet row unit and are arranged to form a row along the pair of linear portions. The second pole teeth extend in the other direction opposite to the one direction and are arranged to form a row along the pair of linear portions.

The first and second claw pole type yoke units are arranged relative to the pair of linear portions of the coil, respectively, so that the first pole teeth of the first claw pole type yoke unit face the second pole teeth of the second claw pole type yoke unit and so that the second pole teeth of the first claw pole type yoke unit face the first pole teeth of the second claw pole type yoke unit.

Each of the permanent magnet rows is interposed between the first claw pole type yoke unit and the second claw pole type yoke unit of a corresponding one of the coil units so that both sides of each of the permanent magnet rows faces the first and second pole teeth of the first claw pole unit and the second claw pole type yoke unit, respectively.

One of the permanent magnet row unit and the armature unit constitutes a movable element and the other of the permanent magnet row unit and the armature unit constitutes a stator.

In the linear motor of the present invention, when currents of different phases flow through coils, respectively, a magnetic flux flows between the pole teeth of the first claw pole type yoke unit and the pole teeth of the second claw pole type yoke unit, each of which is arranged for each coil. For example, the magnetic flux flows from a first pole tooth of the first claw pole type yoke unit, an opposed second pole tooth of the second claw pole type yoke unit, the yoke of the second claw pole type yoke unit, a first pole tooth adjacent to the second pole tooth of the second claw pole type yoke unit, an opposed second pole tooth of the first claw pole type yoke unit, the yoke of the first claw pole type yoke unit, a first pole tooth adjacent to the second pole tooth of the first claw pole type yoke unit, in this stated order. This causes a thrust force to be generated in each of the permanent magnet rows interposed between the first claw pole type yoke unit and the second claw pole type yoke unit arranged for each of the coils.

When each of the permanent magnet rows is interposed between the first claw pole type yoke unit and the second claw pole type yoke unit, the permanent magnet row is arranged in the internal space of the corresponding one of the coil units. For this reason, a magnetic force that draws the permanent magnet row and the first claw pole type yoke unit and a magnetic force that draws the permanent magnet row and the second claw pole type yoke unit are canceled out to each other. As a result, no undue force that draws the permanent magnet row and the first claw pole type yoke unit and no undue force that draws the permanent magnet row and the second claw pole type yoke unit are generated, so that the movable element can be stably arranged. Further, thickness of the linear motor in a direction orthogonal to a moving direction of the movable element of the linear motor can be reduced. A magnetic attraction force can also be reduced. Life of a bearing can be thereby extended.

Further, a magnetic flux flows between the pole tooth of the first claw pole type yoke unit and the pole tooth of the second claw pole type yoke unit, each of which is provided at each of the coil units. Magnetic flux distribution is thereby performed. For this reason, a back yoke formed of a magnetic material does not need to be provided for the permanent magnet row, as in a prior art. As a result, the range of choices of the material of the support used for the permanent magnet rows can be expanded.

Preferably, each of the first pole teeth and each of the second pole teeth are shaped to have cross sectional areas, respectively, which are more reduced as a distance between the cross sectional area and the yoke becomes longer. With this arrangement, cogging torque can be reduced.

It may be so arranged that the armature unit constitutes the stator and the permanent magnet unit constitutes the movable element, and that the coil units are constituted by first to third coil units of three phases shifted from one another by an electrical angle of 120°. In this case, the permanent magnet rows may be constituted by first to third permanent magnet rows provided for the first to third coil units, respectively, and magnetizing directions of the permanent magnets of the first to third permanent magnet rows may be shifted from one another by an electrical angle of 120°, corresponding electrical angle shifts of the first and third coil units, respectively. When the coils are constituted by the coils of three phases, as described above, the necessary thrust force and a necessary speed can be obtained using a comparatively small number of the coils.

When the coil units of three phases are employed as described above, various arrangements of the coil units and the permanent magnet row units can be adopted, and dimensions of the linear motor can be arbitrarily set. For example, the first to third coil units can be arranged in parallel on a nonmagnetic base, and the first to third permanent magnet rows can be arranged substantially in parallel on the support. With this arrangement, the thickness of the linear motor can be reduced.

Alternatively, the first coil unit can be arranged on a first base, and the second and third coil units can be arranged on a second base. In this case, the first and second bases are arranged in parallel. Then, the first permanent magnet row may be arranged on one surface of the support, and the second and third permanent magnet rows may be arranged on the other surface of the support.

Alternatively, the first to third coil units can be arranged on first to third bases, respectively. In this case, the first to third bases are arranged so that the first base faces the third base in parallel and so that the second base is orthogonal to the first and third bases, respectively. Then, it may be so arranged that the support may have a shape extending in the moving direction of the movable element, and that the first to third permanent magnet rows may be arranged to project from the support radially in a direction orthogonal to the moving direction.

It may be so arranged that the armature unit constitutes the stator and the permanent magnet unit constitutes the movable element, and that the coil units are constituted by first to third coil units of three phases shifted from one another by an electrical angle of 120° and fourth to sixth coil units of the three phases shifted from one another by an electrical angle of 120°. In this case, the permanent magnet rows may be constituted by first to sixth permanent magnet rows provided corresponding to the first to sixth coil units, respectively. Magnetizing directions of the permanent magnets of each of the first to third permanent magnet rows may be shifted from one another by an electrical angle of 120° corresponding to electrical angle shifts of the first to third coil units, respectively. Magnetizing directions of the permanent magnets of the fourth to sixth permanent magnet rows may be shifted from one another by an electrical angle of 120° corresponding to electrical angle shifts of the fourth to sixth coil units, respectively. Then, the first to third coil units are arranged on first to third bases, respectively, and the fourth to sixth coil units are arranged on the first base, the fourth base, and the third base, respectively. The first to fourth bases are arranged so that the first base faces the third base, the second base faces the fourth base, the first base is orthogonal to the second base, the second base is orthogonal to the third base, the third base is orthogonal to the fourth base, and the fourth base is orthogonal to the first base. The support is configured to include first and second main body portions extending in the moving direction of the movable element and a coupling portion for coupling the first and second main body portions. Then, the first to third permanent magnet rows may be arranged to project from the first main body portion radially in a direction orthogonal to the moving direction. The fourth to sixth permanent magnet rows may be arranged to project from the second main body portion radially in the direction orthogonal to the moving direction. With this arrangement, the thrust force and the speed can be increased using the six coil units in a linear motor of a comparatively simple configuration.

When the armature unit constitutes the stator and the permanent magnet row unit constitutes the movable element, it is preferable to form the support using aluminum, which is a nonmagnetic substance. With this arrangement, weight of the support can be reduced, so that an acceleration of the linear motor can be increased.

Preferably, apart of surface, of the support, facing the base, and each of surfaces, of the two or more permanent magnetic rows, facing the base and a pair of linear portions of the coil units are covered with a piece of metal cover member. With this arrangement, the permanent magnet rows can be securely fixed to the support by the metal cover member. The metal cover member may be a magnetic substance or the nonmagnetic substance. When stainless steel is used as the metal cover member, corrosion of the metal cover member can be prevented.

The first and second claw pole type yoke units of various structures can be employed for the linear motor of the present invention. The first claw pole type yoke unit and the second claw pole type yoke unit, for example, can be configured by combining one first magnetic plate, one second magnetic plate, and a plurality of magnetic connecting plates connecting the first magnetic plate and the second magnetic plate. In this case, the respective first pole teeth of the first and second claw pole type yoke units facing each other are formed by raising notches formed in the first magnetic plate. The respective second pole teeth of the first and second claw pole type yoke units facing each other are formed by raising notches formed in the second magnetic plate. Then, the magnetic connecting plates may be arranged so that the coil is located between the two adjacent magnetic connecting plates of the first to fourth magnetic connecting plates interposed between the first magnetic plate and the second magnetic plate. With this arrangement, the first magnetic plate, second magnetic plate, and first to fourth connecting plates allow easy formation of the first and second claw pole type yoke units of a complicated shape. Especially, the first pole teeth and the second pole teeth can be formed easily and simultaneously by a simple work of raising the notches formed in the magnetic plates.

According to the present invention, each of the permanent magnet rows is arranged between the first claw pole type yoke unit and the second claw pole type yoke unit. Thus, the permanent magnet row is arranged in the internal space of each coil unit. For this reason, the magnetic force which draws the permanent magnet row and the first claw pole type yoke unit and the magnetic force which draws the second claw pole type yoke unit and the permanent magnet row are canceled out. As a result, no undue force that draws the permanent magnet row and the first claw pole type yoke unit and no undue force that draws the permanent magnet row and the second claw pole type yoke unit are not generated. The movable element can be thereby arranged stably. Further, the thickness of the linear motor in the direction orthogonal to the moving direction of the movable element can be reduced. The magnetic attraction force can also be reduced, so that the life of the bearing can be extended.

Further, in the linear motor of the present invention, the magnetic flux flows between the pole teeth of the first claw pole type yoke unit and the second claw pole type yoke unit which are provided for each coil. The magnetic flux distribution is thereby performed. For this reason, it is not necessary to provide the back yoke made of the magnetic material for the permanent magnet row, as in the prior art. As a result, the range of choices of the material used for the support for the permanent magnet rows can be expanded.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF PREFERRED EMBODIMENTS

Embodiments of the present invention will be described below in detail with reference to drawings.

Figure 1:
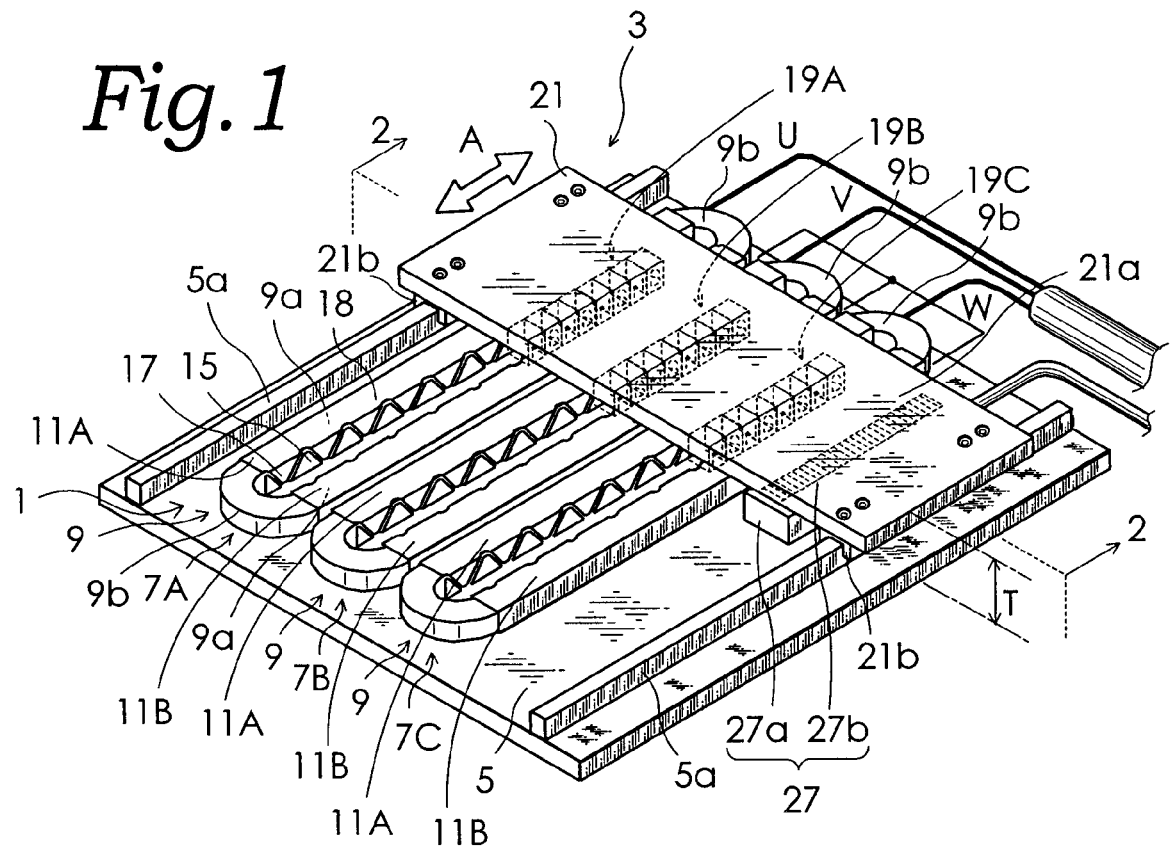
FIG. 1 is a perspective view of a linear motor according to a first embodiment of the present invention.
Figure 2:
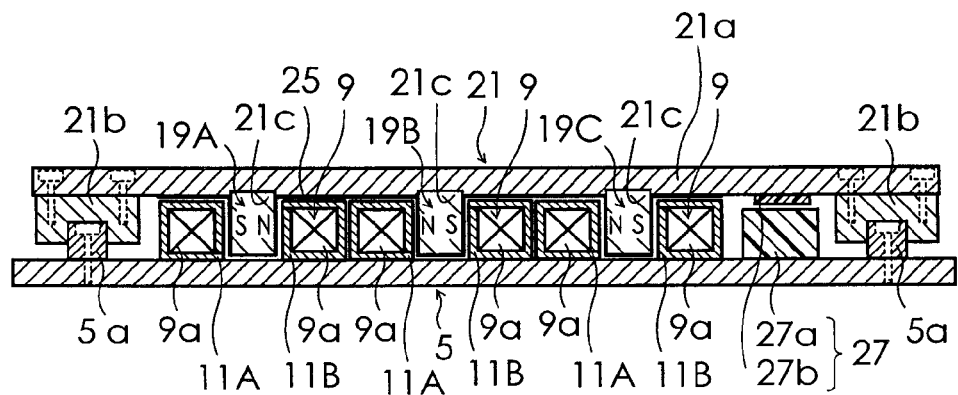
FIG. 2 is a sectional view taken along a line II-II in FIG. 1.
Figure 3:
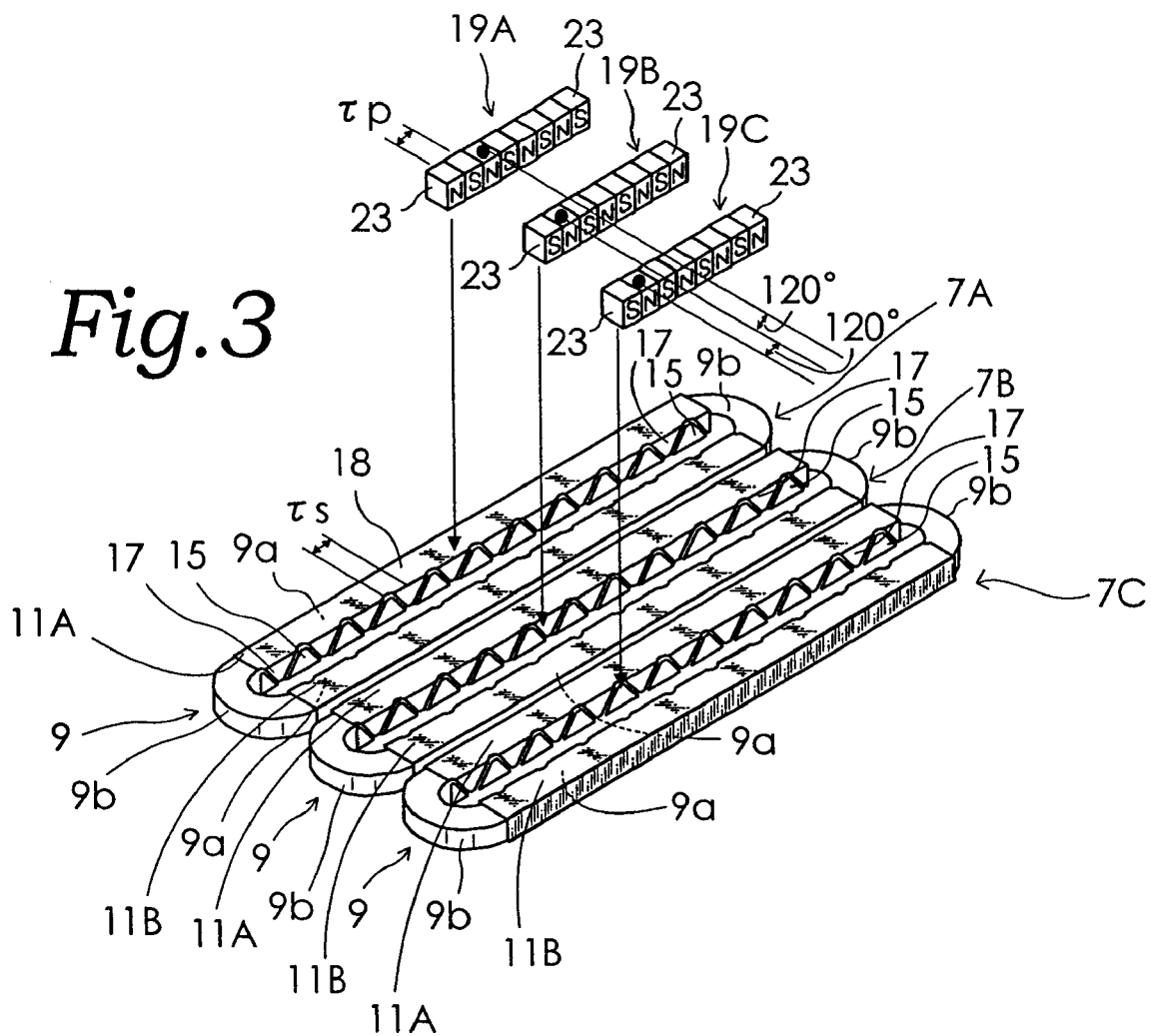
FIG. 3 is an exploded view of part of FIG. 1.

FIG. 1 is a perspective view showing a linear motor according to a first embodiment of the present invention. FIG. 2 is a sectional view taken along a line II-II in FIG. 1. FIG. 3 is an exploded view of part of FIG. 1. As shown in each of the drawings, the linear motor in this embodiment includes an armature unit 1 constituting a stator, a permanent magnet row unit 3 constituting a movable element, and a base 5 formed of an iron or aluminum plate. The armature unit 1 includes three coil units constituted by first to third coil units 7A to 7C. Each of the coil units 7A to 7C has a coil 9 and first and second claw pole type yoke units 11A and 11B arranged for the coil 9, respectively. As shown in FIG. 3, the coil 9 is constituted by annularly winding winding conductors. The coil 9 includes a pair of linear portions 9a that extend linearly and face each other with a spacing therebetween and a pair of coupling portions 9b that couples the pair of linear portions 9a. Coils 9 are arranged side by side on the base 5 so that the pair of linear portions 9a for each coil 9 becomes parallel. Currents of three phases of a U phase, a V phase, and a W phase that are shifted to one another by an electrical angle of 120° flow through the coils 9 of the coil units 7A to 7C, respectively.

For the pair of linear portions 9a for each coil 9, first and second claw pole type yoke units 11A and 11B are arranged, respectively, so that the pair of linear portions 9a extends inside thereof. Each of the first and second claw pole type yoke units 11A and 11B is formed by processing a magnetic plate made of a silicon steel plate, and includes a plurality of first pole teeth 15, a plurality of second pole teeth 17, and a yoke 18 with a U-shaped section that magnetically couples the first pole teeth to the second pole teeth. The first pole teeth 15 extend in one direction that proceeds from the armature unit 1 to the permanent magnet row unit 3, and arranged so as to form a row along the linear portions 9a of each coil. The second pole teeth 17 extend in the other direction opposite to the one direction and arranged so as to form a row along the linear portions 9a of each coil. Then, each first pole tooth 15 and a second pole tooth 17 adjacent thereto are arranged at a predetermined pitch τS so that each of the first pole teeth 15 is mutually engaged with each of the second pole teeth 17 without being in contact with each other. Each first pole tooth 15 and each second pole tooth 17 both have triangle surfaces, respectively. This means that the first pole tooth 15 and the second pole tooth 17 are shaped to have cross sectional areas, respectively, which are more reduced as a distance between the cross sectional area and the yoke 18 becomes longer.

Figure 4:
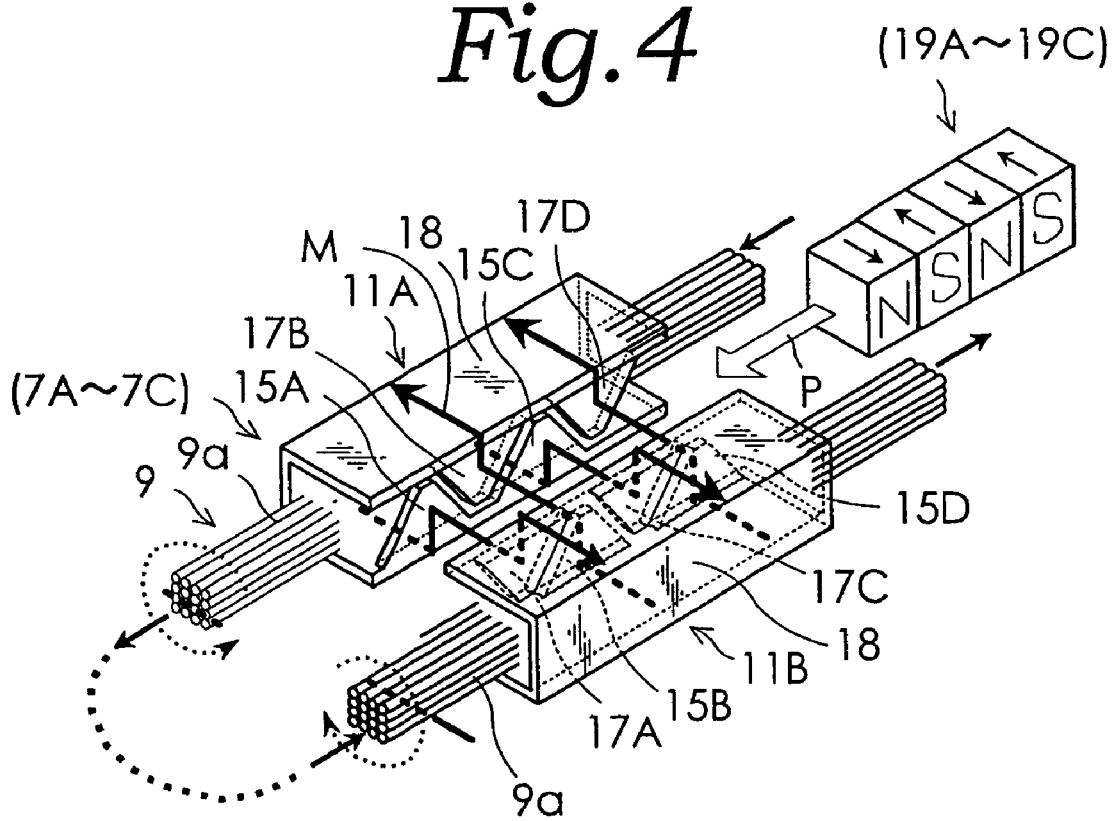
FIG. 4 is a diagram for explaining a magnetic flux flow in the linear motor in the first embodiment of the present invention.

As shown in FIG. 4, the first and second claw pole type yoke units 11A and 11B are arranged so that the first pole teeth 15 (first pole teeth 15A and 15C in FIG. 4) of the first claw pole type yoke unit 11A face the second pole teeth 17 (second pole teeth 17A and 17C in FIG. 4) of the second claw pole type yoke unit 11B, respectively, and so that the second pole teeth 17 (second pole teeth 17B and 17D in FIG. 4) of the first claw pole type yoke unit 11A face the first pole teeth 15 (first pole teeth 15B and 15D in FIG. 4) of the second claw pole type yoke unit 11B, respectively.

As shown in FIG. 1, the permanent magnet row unit 3 includes first to third permanent magnet rows 19A to 19C and a support 21 for supporting the first to third permanent magnet rows 19A to 19C in a state they are arranged in parallel. As shown in FIG. 3, each of the first to third permanent magnet rows 19A to 19C is constituted by a plurality of permanent magnets 23 arranged substantially at a same pitch τp as the pitch τs for the first pole tooth 15 and the second pole tooth 17 that are adjacent to each other in the claw pole type yoke unit. Polarities of the permanent magnets 23 appear alternately on each permanent magnet row. The permanent magnets 23 are magnetized so that a magnetic pole of each permanent magnet 23 appears on each side of the first to third permanent magnet rows 19A to 19c in a direction in which the first to third permanent magnet rows 19A to 19C are arranged, and so that the different polarities of magnetic poles appear alternately on each of the permanent magnet rows 19A to 19C in the direction in which the permanent magnet rows 19A to 19C extend. Then, the three first to third permanent magnet rows 19A to 19C are arranged on the support 21, being shifted to one another by an electrical angle of 120°. Specifically, a permanent magnet 23 in the first permanent magnet row 19A is arranged to face respective half portions of one permanent magnet 23 and the other permanent magnet 23 that are adjacent to each other in the second permanent magnet row 19B. Further, a permanent magnet 23 in the second permanent magnet row 19B is arranged to face respective half portions of one permanent magnet 23 and the other permanent magnet 23 that are adjacent to each other in the third permanent magnet row 19C. Then, the first permanent magnet row 19A is interposed between the first claw pole type yoke unit 11A and the second claw pole type yoke unit 11B in the first coil unit 7A so that both sides of the first permanent magnet row 19A face the first pole teeth 15 and the second pole teeth 17 of the first claw pole type yoke unit 11A and the first pole teeth 15 and the second pole teeth 17 of the second claw pole type yoke unit 11B, respectively. The second permanent magnet row 19B is interposed between the first claw pole type yoke unit 11A and the second claw pole type yoke unit 11B in the second coil unit 7B so that both sides of the second permanent magnet row 19B face the first pole teeth 15 and the second pole teeth 17 of the first claw pole type yoke unit 11A and the first pole teeth 15 and the second pole teeth 17 of the second claw pole type yoke unit 11B, respectively. The third permanent magnet row 19C is interposed between the first claw pole type yoke unit 11A and the second claw pole type yoke unit 11B in the third coil unit 7C so that both sides of the third permanent magnet row 19C face the first pole teeth 15 and the second pole teeth 17 of the first claw pole type yoke unit 11A and the first pole teeth 15 and the second pole teeth 17 of the second claw pole type yoke unit 11B, respectively.

As shown in FIGS. 1 and 2, the support 21 is made of a nonmagnetic substance such as aluminum and includes a stage main body 21a with the first to third permanent magnet rows 19A to 19C fixed thereto and a pair of linear bearings 21b fixed to the stage main body 21a. In this embodiment, as shown in FIG. 2, three grooves 21c each having a depth of 0.5 to 2 mm are formed in the stage main body 21a. Then, the first to third permanent magnet rows 19A to 19C are fit into these three grooves 21c, and using an adhesive, the first to third permanent magnet rows 19A to 19C are fixed to the stage main body 21a. A part of surface, of the support 21, facing the base 5, and each of surfaces, the first to third permanent magnetic rows 19A to 19C, facing the base 5 and a pair of linear portions 9a of the coil units 7A to 7C are covered with a piece of metal cover member 25. The metal cover member 25 may be made of a magnetic substance or the nonmagnetic substance. In this embodiment, the metal cover member 25 is fabricated by processing a stainless plate or the like. The metal cover member 25 and surfaces of the support 21 and the permanent magnet rows 19A to 19C may be bonded by the adhesive. This support 21 is slidably supported by a pair of side walls 5a of the base 5 respectively arranged on the sides of the first coil unit 7A and the third coil unit 7C through the linear bearings 21b. For this reason, the first to third permanent magnet rows 19A to 19C are movably arranged in internal spaces of the first coil unit 7A, second coil unit 7B, and third coil unit 7C, respectively, in directions in which the pair of linear portions 9a of the coil 9 extends or in the directions indicated by a double-sided arrow A. In this embodiment, a sensor head 27a of a position detection device 27 is arranged on the base 5, and a scale 27b is arranged on the support 21. The scale 27b faces the sensor head 27a with a predetermined spacing therebetween. With this arrangement, detection of positions of the first to third permanent magnet rows 19A to 19C relative to the first to third coil units 7A to 7C, respectively, is performed.

In the linear motor in this embodiment, when a current flows through each coil 9 of the first to third coil units 7A to 7C, a magnetic flux flows between the first claw pole type yoke unit 11A and the second claw pole type yoke unit 11B, which are arranged for each coil 9. When the current flows through the coil 9, the magnetic flux flows from the first pole tooth 15A of the first claw pole type yoke unit 11A, second pole tooth 17A of the second claw pole type yoke unit 11B, yoke 18 of the second claw pole type yoke unit 11B, first pole tooth 15B of the second claw pole type yoke unit 11B, second pole tooth 17B of the first claw pole type yoke unit 11A, yoke 18 of the first claw pole type yoke unit 11A, first pole tooth 15C of the first claw pole type yoke unit 11A, second pole tooth 17C of the second claw pole type yoke unit 11B, yoke 18 of the second claw pole type yoke unit 11B, first pole tooth 15D of the second claw type yoke unit 11B, second pole tooth 17D of the first claw pole type yoke unit 1A, in this stated order, as shown in arrows M in FIG. 4. This causes a thrust force P to be generated in each of the permanent magnet rows 19A to 19C interposed between the first claw pole type yoke unit 11A and the second claw pole type yoke unit 11B provided for the coil 9 of each of the coil units 7A to 7C of the three phases.

In the linear motor in this embodiment, each of the permanent magnet rows 19A to 19C is arranged between the first claw pole type yoke unit 11A and the second claw pole type yoke unit 11B. Thus, the permanent magnet rows 19A to 19C are arranged in internal spaces of the coil units 7A to 7C, respectively. For this reason, a magnetic force that draws each of the permanent magnet rows 19A to 19C and the first claw pole type yoke unit 11A and a magnetic force that draws each of the permanent magnet rows 19A to 19C and the second claw pole type yoke unit 11B are canceled out to each other. As a result, no undue force that draw each of the permanent magnet rows 19A to 19C and the first claw pole type yoke unit 11A and no undue force that draws each of the permanent magnet rows 19A to 19C and the second claw pole type yoke unit 11B are not generated, and the movable element or the permanent magnet row unit 3 can be stably arranged. Further, thickness of the linear motor (indicated by T in FIG. 1) in a direction orthogonal to a moving direction of the movable element or the permanent magnet row unit 3 of the linear motor can be reduced. Further, a magnetic attraction force can be reduced, thereby extending life of the linear bearings 21b. Further, the magnetic flux flows between the pole tooth 15 of the first claw pole type yoke unit 11A and the pole tooth 17 of the second claw pole type yoke unit 11B, between the pole tooth 15 of the second claw pole type yoke unit 11B between the pole tooth 17 of the first claw pole type yoke unit 11A. Magnetic flux distribution in the first and second claw pole type yoke units 11A and 11B provided at each of the coil units 7A to 7C is thereby performed. For this reason, a back yoke formed of a magnetic material does not need to be provided for the permanent magnet row, as in a prior art. As a result, the range of choices of the material used for the support for the permanent magnet rows can be expanded. In this embodiment, the support 21 is formed of aluminum, which is the nonmagnetic substance. Thus, weight of the support 21 can be reduced, so that an acceleration of the linear motor can be increased.

Figure 5:
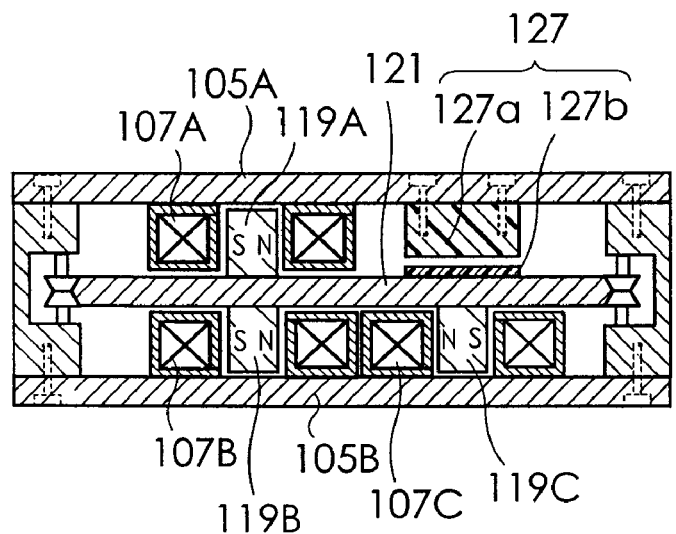
FIG. 5 is a sectional view of a linear motor according to a second embodiment of the present invention.

In the embodiment described above, the first to third coil units 7A to 7C are arranged side by side in parallel on the base 5, and the first to third permanent magnet rows 19A to 19C are arranged substantially in parallel on the support 21. Various positional relationships between the coil units and the permanent magnet rows can be employed for the linear motor. A linear motor according to a second embodiment shown in FIG. 5, for example, has first and second bases 105A and 105B that face each other and are arranged in parallel. Then, a first coil unit 107A is arranged on the first base 105A, while second and third coil units 107B and 107C are arranged on the second base 105B side by side. Then, a first permanent magnet row 119A is arranged on one surface of a support 121, while second and third permanent magnet rows 119B and 119C are arranged on the other surface of the support 121 side by side. The second permanent magnet row 119B is arranged in a position that faces the first permanent magnet row 119A through the support 121. In this embodiment, a sensor head 127A of a position detecting device 127 is arranged on the first base 105A, and a scale 127b is arranged in a location on the support 121 that faces the third permanent magnet row 119C. The scale 127b faces the sensor head 127a with a predetermined spacing therebetween.

Figure 6:
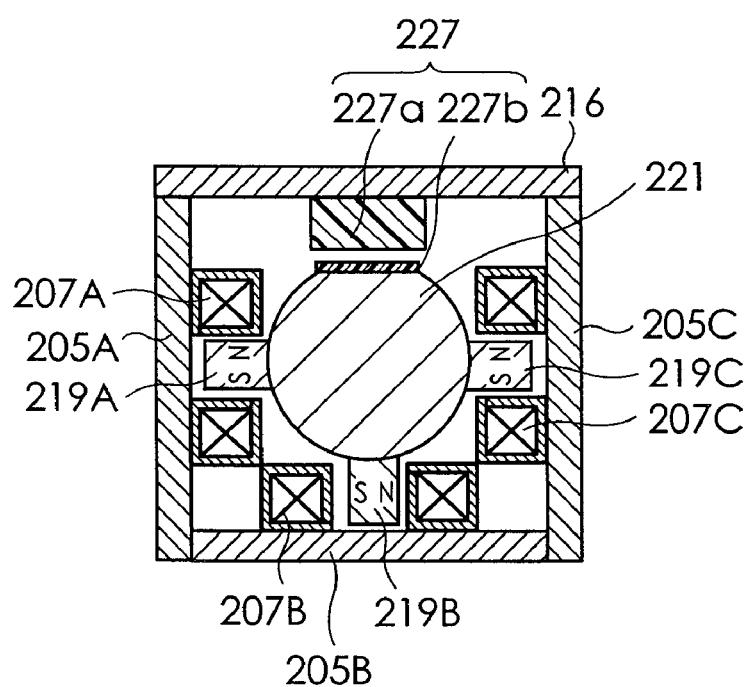
FIG. 6 is a sectional view of a linear motor according to a third embodiment of the present invention.

A linear motor according to a third embodiment, shown in FIG. 6 includes first to third bases 205A to 205C and a lid portion 216. The first to third bases 205A to 205C are arranged so that the first base 205A faces the third base 205C in parallel and so that the second base 205B is orthogonal to the first and third bases 205A and 205C, respectively. The lid portion 216 is arranged to face the second base 205B in parallel, being connected to the first base 205A and the third base 205C. First to third coil units 207A to 207C are arranged on the first to third bases 205A to 205C, respectively. A support 221 has a shape close to a cylindrical shape that extends in a moving direction of the movable element. First to third permanent magnet rows 219A to 219C are arranged so that the permanent magnet rows project from the support 221 radially in directions orthogonal to the moving direction, respectively, being separated from one another at an angle of 90°. In this embodiment, a sensor head 227a of a position detection device 227 is arranged on the lid portion 216. Then, a scale 227b is arranged in a location that faces the second permanent magnet row 219B through the support 221. The scale 227B faces the sensor head 227a with a predetermined spacing therebetween.

Figure 7:
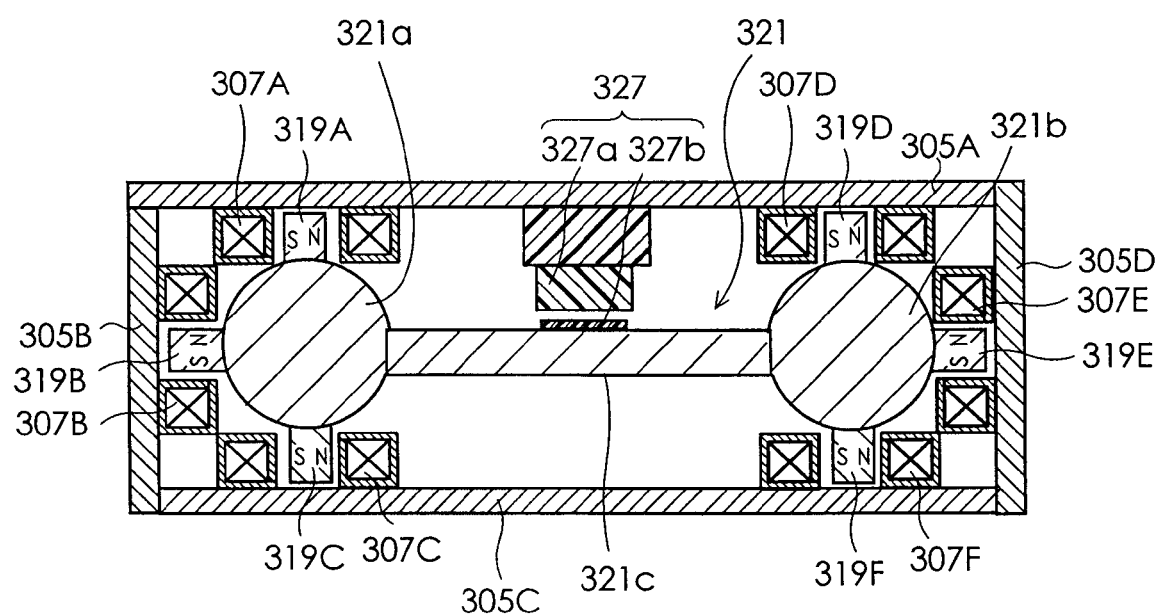
FIG. 7 is a sectional view of a linear motor according to a fourth embodiment of the present invention.

A linear motor according to a fourth embodiment, shown in FIG. 7 has six coil units constituted by first to sixth coil units 307A to 307F and first to fourth bases 305A to 305D. The first to fourth bases 305A to 305D are arranged so that the first base 305A faces the third base 305C, so that the second base 305B faces the fourth base 305D, so that the first base 305A is orthogonal to the second base 305B, so that the second base 305B is orthogonal to the third base 305C, so that third base 305C is orthogonal to the fourth base 305D, and so that the fourth base 305D is orthogonal to the first base 305A. Then, the first to third coil units 307A to 307C are arranged on the first to third bases 305A to 305C, respectively. The fourth to sixth coil units 307D to 307F are arranged on the first base 305A, fourth base 305D, and third base 305C, respectively. Currents of the three phases (of the U phase, V phase, and W phase) shifted from one another by an electrical angle of 120° flow through the first to third coil units 307A to 307C, respectively. Currents of the three phases (of the U phase, V phase and W phase) shifted from one another by an electrical angle of 120° flow through the fourth to sixth coil units 307D to 307F, respectively.

A support 321 includes first and second main body portions 321a and 321b that extend in a moving direction of the movable element and a coupling portion 321c that couples the first main body portion 321a and the second main body portion 321b. Then, first to third permanent magnet rows 319A to 319C project from the first main body portion 321a radially in directions orthogonal to the moving direction, respectively, being separated from one another at an angle of 90°. The fourth to sixth permanent magnet rows 319D to 319F project radially from the second main body portion 321b in directions orthogonal to the moving direction of the movable element, respectively, being separated from one another at an angle of 90°. Magnetizing directions of permanent magnets of the first to third permanent magnet rows 319A to 319C are shifted from one another by an electrical angle of 120°, and these shifts are equivalent to electrical angle shifts of the first to third coil units 307A to 307C, respectively. Magnetizing directions of permanent magnets of the four to sixth permanent magnet rows 319D to 319F are shifted from one another by an electrical angle of 120°, and these shifts are equivalent to electrical angle shifts of the fourth to sixth coil units 307D to 307F, respectively.

In this embodiment, a sensor head 327a of a position detection device 327 is arranged on the first base 305A, and a scale 327b is arranged on the coupling portion 321c of the support 321. The scale 327b faces the sensor head 327a with a predetermined spacing therebetween.

Figure 8:
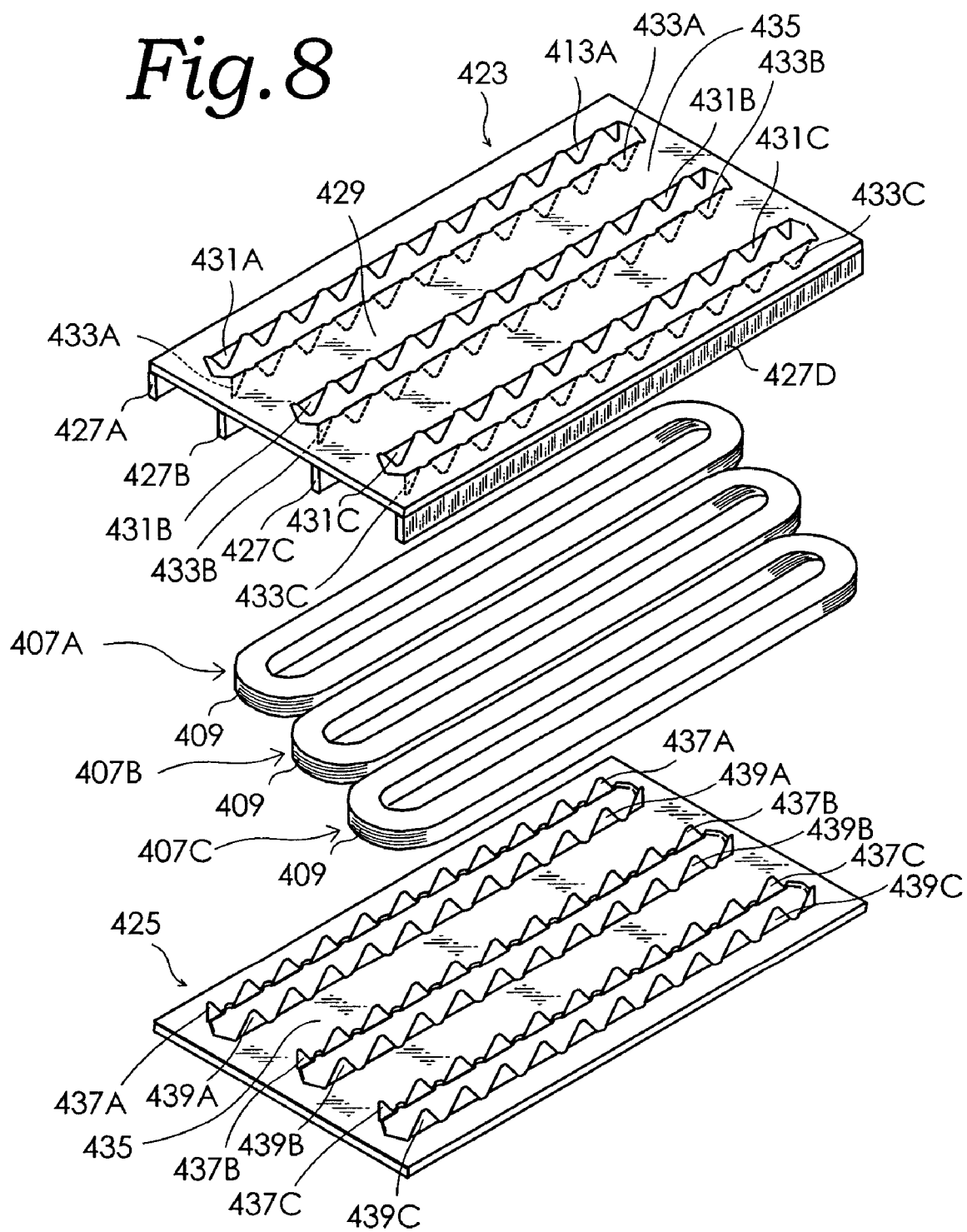
FIG. 8 is an exploded perspective view of a linear motor according to a fifth embodiment.

FIG. 8 is an exploded perspective view of a linear motor according to a fifth embodiment. In the linear motor in this embodiment, the first and second claw pole type yoke units arranged for each coil 409 of first to third coil units 407A to 407C are constituted by a combination of a first magnetic plate 423, a second magnetic plate 425, and first to fourth magnetic connecting plates 427A to 427D.

Figure 9A:
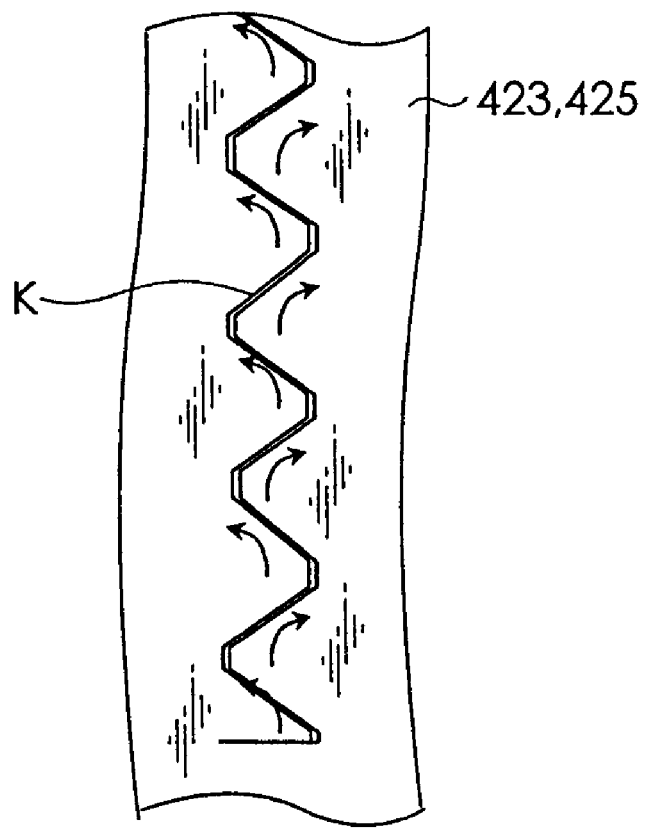
FIG. 9A is a diagram showing a state in which first or second magnetic teeth of the linear motor in the fifth embodiment are formed.
Figure 9B:
FIG. 9B is a diagram showing the state in which the first or second magnetic teeth of the linear motor in the fifth embodiment are formed.

Respective first pole teeth (431A, 433A), (431B, 433B), and (431C, 433C) of the first and second claw pole type yoke units that face each other are formed by raising notches in the first magnetic plate 423. Specifically, as shown in FIG. 9, the first pole teeth are formed by raising wavy notches K. Respective second pole teeth (437A, 439A), (437B, 439B), and (437C, 439C) of the first and second claw pole type yoke units that face each other are formed by raising the notches in the second magnetic plate 425. Then, the first to fourth magnetic connecting plates 427A to 427D are arranged so that the coil 409 is located between the two adjacent magnetic connecting plates of the first to fourth magnetic connecting plates 427A to 427D interposed between the first magnetic plate 423 and the second magnetic plate 425. Specifically, the first to fourth magnetic connecting plate 427A to 427D are arranged so that the coil 409 of the first coil unit 407A is located between the first magnetic connecting plate 427A and the second magnetic connecting plate 427B interposed between the first magnetic plate 423 and the second magnetic plate 425, the coil 409 of the second coil unit 407B is located between the second magnetic connecting plate 427B and the third magnetic connecting plate 427C interposed between the first magnetic plate 423 and the second magnetic plate 425, and the coil 409 of the third coil unit 407C is located between the third magnetic connecting plate 427C and the fourth magnetic connecting plate 427D interposed between the first magnetic plate 423 and the second magnetic plate 425. The first magnetic plate 423, second magnetic plate 425, and first to fourth connecting plates 427A to 427D according to this embodiment allow easy formation of the first and second claw pole type yoke units of a complicated shape. Especially, the first pole teeth 433A to 433C and the second pole teeth 439A to 439C can be formed easily and simultaneously by a simple work of raising the notches K formed in the magnetic plates.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A linear motor comprising:
    a permanent magnet row unit including:
    a plurality of permanent magnet rows each formed of a row of a plurality of permanent magnets; and
    a support for supporting said permanent magnet rows in a state where said permanent magnet rows are arranged in parallel,
    said permanent magnets constituting said permanent magnet row being magnetized so that magnetic poles of each of said permanent magnets appear on both sides thereof, which oppose each other in a direction in which said permanent magnet row are arranged, and so that different polarities of magnetic poles appear alternatively in the direction in which said permanent magnet row extends; and
    an armature unit including a plurality of coil units respectively provided corresponding to said permanent magnet rows, said armature unit being set with said permanent magnet row unit;
    each of said coil units of said armature unit including a coil made of annularly wound winding conductor and first and second claw pole type yoke units arranged at the coil, the first and second claw pole type yoke units being structured to be arranged on the coil so that a main portion of an internal space of each of said coil units is formed between the first claw pole type yoke unit and the second claw pole type yoke unit;
    the coil including a pair of linear portions extending linearly and facing each other with the main portion of the internal space therebetween and a pair of coupling portions coupling the pair of linear portions;
    the first and second claw pole type yoke units being arranged at the pair of linear portions of the coil, respectively, so that a corresponding one of the pair of linear portions extends through each of the first and second claw pole type yoke unit;
    each of the first and second claw pole type yoke units including first pole teeth, second pole teeth, and a yoke magnetically coupling the first pole teeth to the second pole teeth, the first pole teeth extending in one direction proceeding from said armature unit to said permanent magnet row unit and being arranged to form a row along the corresponding linear portion, the second pole teeth extending in the other direction opposite to the one direction and being arranged to form a row along the corresponding linear portion;
    the first and second claw pole type yoke units being arranged relative to the pair of linear portions of the coil, respectively, so that the first pole teeth of the first claw pole type yoke unit face the second pole teeth of the second claw pole type yoke unit and so that the second pole teeth of the first claw pole type yoke unit face the first pole teeth of the second claw pole type yoke unit;
    each of said permanent magnet rows being interposed between the first claw pole type yoke unit and the second claw pole type yoke unit of a corresponding one of said coil units so that the both sides of said each of said permanent magnet rows face the first and second pole teeth of the first claw pole type unit and the second claw pole type yoke unit, respectively; and
    one of said permanent magnet row unit and said armature unit constituting a movable element and the other of said permanent magnet row unit and said armature unit constituting a stator.

2. The linear motor according to claim 1, wherein each of the first pole teeth and each of the second pole teeth are shaped to have cross sectional areas, respectively, which are more reduced as a distance between the cross sectional area and the yoke becomes longer.

3. The linear motor according to claim 1, wherein
    said armature unit is said stator and said permanent magnet unit is said movable element;
    said coil units are constituted by first to third coil units of three phases shifted from one another by an electrical angle of 120°;
    said permanent magnet rows are constituted by first to third permanent magnet rows provided corresponding to said first to third coil units, respectively; and
    said first to third permanent magnet rows are shifted from one another by an electrical angle of 120°, corresponding electrical angle shifts of said first and third coil units, respectively.

4. The linear motor according to claim 3, wherein said first to third coil units are arranged in parallel on a nonmagnetic base; and
    said first to third permanent magnet rows are arranged substantially in parallel on said support.

5. The linear motor according to claim 3, wherein said first coil unit is arranged on a first base;
    said second and third coil units are arranged on a second base;
    said first permanent magnet row is arranged on one surface of said support;
    said second and third permanent magnet rows are arranged on the other surface of said support; and
    said first and second bases are arranged in parallel, facing each other through said support.

6. The linear motor according to claim 3, wherein said first to third coil units are arranged on first to third bases, respectively;
    said first to third bases are arranged so that said first base faces said third base in parallel and so that said second base is orthogonal to said first and third bases, respectively;
    said support has a shape extending in a moving direction of said movable element; and
    said first to third permanent magnet rows are arranged to project from said support in three directions orthogonal to the moving direction respectively.

7. The linear motor according to claim 1, wherein said armature unit is said stator and said permanent magnet unit is said movable element;

said coil units are constituted by first to third coil units of three phases shifted from one another by an electrical angle of 120° and fourth to sixth coil units of the three phases shifted from one another by an electrical angle of 120°;

said permanent magnet rows are constituted by first to sixth permanent magnet rows provided corresponding to said first to sixth coil units, respectively;

said first to third permanent magnet rows are shifted from one another by an electrical angle of 120° corresponding to electrical angle shifts of said first to third coil units, respectively;

said fourth to sixth permanent magnet rows are shifted from one another by an electrical angle of 120° corresponding to electrical angle shifts of said fourth to sixth coil units, respectively;

first to forth bases being provided for arranging the first to sixth coil units;

said first to fourth bases are arranged so that said first base faces said third base, said second base faces said fourth base, said first base is orthogonal to said second base, said second base is orthogonal to said third base, said third base is orthogonal to said fourth base, and said fourth base is orthogonal to said first base;

said first to third coil units are arranged on the first to third bases, respectively;

said fourth to sixth coil units are arranged on said first base, said fourth base, and said third base, respectively;

said support includes first and second main body portions extending in a moving direction of said movable element and a coupling portion for coupling said first and second main body portions;

said first to third permanent magnet rows are arranged to project from said first main body portion in three directions orthogonal to the moving direction; and said fourth to sixth permanent magnet rows are arranged to project from said second main body portion in three directions orthogonal to the moving direction.

8. The linear motor according to claim 1, wherein said support is made of aluminum.

9. The linear motor according to claim 1, wherein said two or more coil units are arranged on a nonmagnetic base; and a part of surface, of said support, facing said base, and each of surfaces, of said two or more permanent magnetic rows, facing said base and said pair of linear portions of said coil units are covered with a piece of metal cover member.

10. The linear motor according to claim 9, wherein said metal cover member is made of stainless steel.

11. The linear motor according to claim 1, wherein said first claw pole type yoke unit and said second claw pole type yoke unit arranged for said each of said coil units comprise a combination of a first magnetic plate, a second magnetic plate, and a plurality of magnetic connecting plates connecting said first magnetic plate and said second magnetic plate;

the respective first pole teeth of said first and second claw pole type yoke units facing each other are formed by raising portions between notches formed in said first magnetic plate;

the respective second pole teeth of said first and second claw pole type yoke units are formed by raising portions between notches formed in said second magnetic plate; and said magnetic connecting plates are arranged so that the coil is located between the two adjacent magnetic connecting plates in the plurality of magnetic connecting plates and interposed between said first magnetic plate and said second magnetic plate.

* * * * *